United States Patent [19]
Fujisaki et al.

[11] Patent Number: 5,315,667
[45] Date of Patent: May 24, 1994

[54] ON-LINE HANDWRITING RECOGNITION USING A PROTOTYPE CONFUSABILITY DIALOG

[75] Inventors: Tetsunosuke Fujisaki, Armonk; Joonki Kim, White Plains; George J. Leibman, Mt. Kisco; Charles C. Tappert, Ossining, all of N.Y.

[73] Assignee: International Business Machines Corporation, Armonk, N.Y.

[21] Appl. No.: 785,735

[22] Filed: Oct. 31, 1991

[51] Int. Cl.⁵ .............................................. G06K 9/00
[52] U.S. Cl. .................................... 382/13; 382/57
[58] Field of Search ............... 382/13, 7, 57, 30, 34; 340/718, 794; G06K 9/00, 9/62, 9/68, 9/03; G09G 3/02, 1/26

[56] References Cited

U.S. PATENT DOCUMENTS

| | | | |
|---|---|---|---|
| 4,672,677 | 6/1987 | Yamakawa | 382/13 |
| 4,860,372 | 8/1989 | Kuzunuki et al. | 382/13 |
| 4,914,709 | 4/1990 | Rudak | 382/57 |
| 5,150,424 | 9/1992 | Aguro | 382/13 |

Primary Examiner—Yon J. Couso
Attorney, Agent, or Firm—Jack M. Arnold; Marc D. Schechter

[57] ABSTRACT

A handwriting recognition system in which a user, on-line can reduce similarity between different prototypes. The user interactively can delete a prototype or add a new prototype, while at the same time is not allowed to delete a prototype when it is the only prototype for a given character.

20 Claims, 4 Drawing Sheets

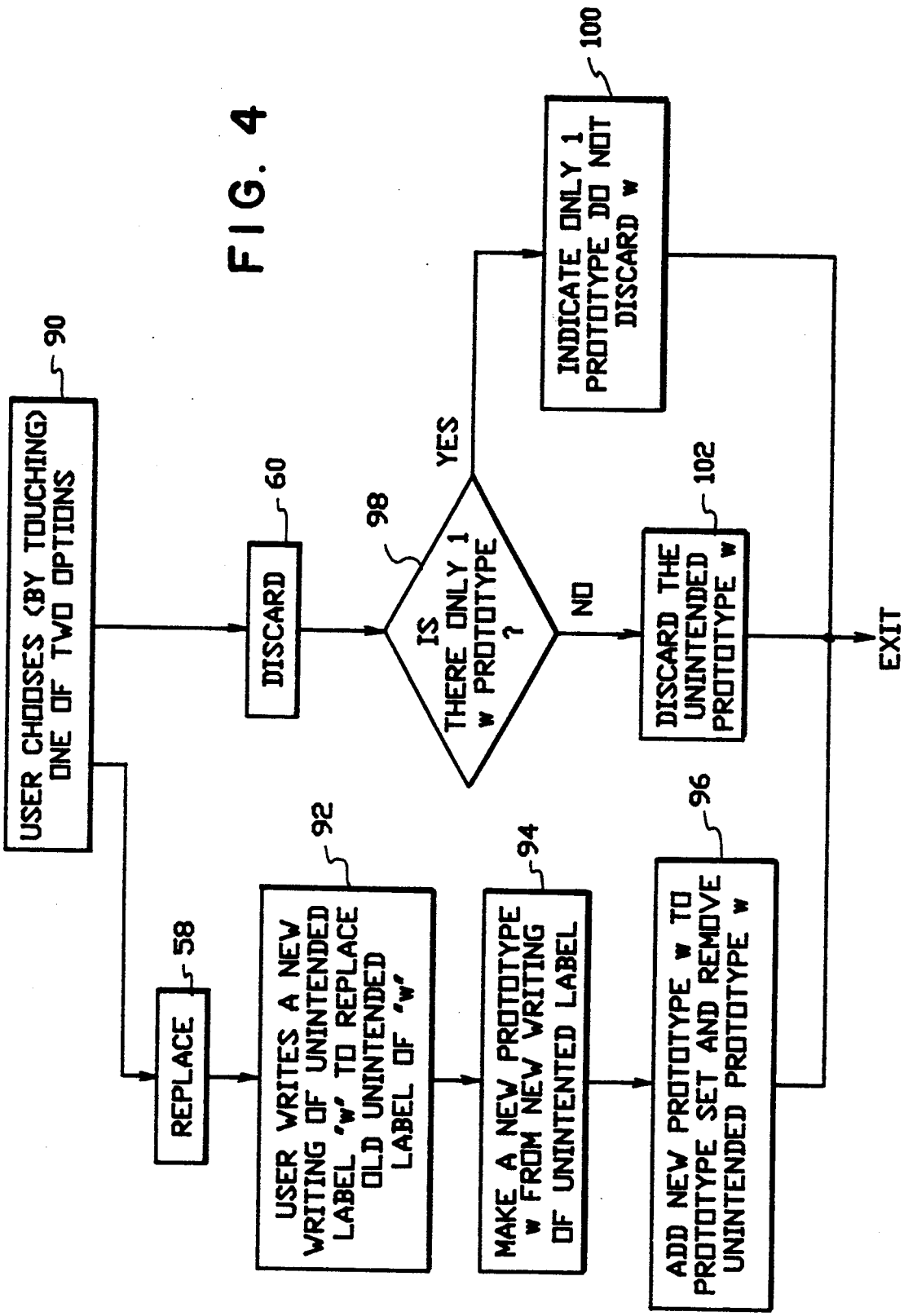

ON-LINE HANDWRITING RECOGNITION USING A PROTOTYPE CONFUSABILITY DIALOG

FIELD OF THE INVENTION

The invention is in the field of handwriting recognition, and specifically is directed to reducing similarity between different prototype characters.

BACKGROUND OF THE INVENTION

Many on-line, handwriting recognition systems use curve matching methods to match an unknown character against prototype (template) characters. The accuracy of these recognizers depends on the quality of the prototypes and the speed of recognition depends on the number of prototypes. The problem is to design prototype establishment procedures that optimize recognition accuracy and speed.

In order to provide recognition accuracy, desired properties of prototypes are:

(1) The prototypes should have sufficient coverage, that is, there should be at least one prototype for each distinct way of writing a character (or recognition strategies that handle variation). With on-line handwriting, this includes variations in the number, order, direction, and shape of the strokes of a character. A stroke is the writing from pen-down to pen-up.

(2) A prototype should be a good representation of a way of writing a character.

(3) Prototypes should have reasonable separation in prototype space.

The following patents are cited as of general interest to the state of the art of handwriting recognition.

A first group of patents is directed to handwriting recognition per se, but not on-line handwriting recognition. This first group includes:

U.S. Pat. No. 4,523,331 to Asija discloses a computer algorithm and apparatus for automated image input (including recognition), storage and output (including image generation). Each image is transformed into a unique binary number and then stored as such. This unique binary number is obtained by adding unique binary value of each pixel present in that image. Means for processing handwriting and colored images are also disclosed. Image recognition and matching takes place by comparing the binary value of the new image received against all images stored in the descending order of difference in binary values. Thus the computer is able to recognize bad handwriting even when the difference between the ideal or stored samples on the one hand and the new image is substantial without consistency. The computer also stores data about its errors as well as corrections received from the user. For this and other reasons each user has a unique number.

U.S. Pat. No. 4,654,873 to Fujisawa et al discloses a pattern segmentation and recognition system in which handwritten characters are transformed electrically into 2-dimensional image patterns, wherein if ambiguity exists in segmenting a unit pattern including a character from the image patterns, character recognition is not made compulsively, but a plurality of possible unit patterns are first established. Then, the various unit patterns are segmented, and each unit pattern is identified to be a partial pattern, linked patterns, etc., so that each character is recognized on a basis of total judgement, whereby ambiguity of segmentation is resolved.

U.S. Pat. No. 4,972,499 to Kurosawa discloses a pattern recognition apparatus which has a contour segmentation unit for dividing an input pattern into segments, a characteristic extraction unit for extracting characteristics of the input segments, and a reference unit for storing characteristic data of reference patterns. The reference unit includes a main reference and a detailed matching reference. The main reference stores partial pattern characteristic data representing the characteristics of segments of each reference pattern. The detailed matching reference stores detailed characteristic data of each reference pattern together with a program for specifying an operation procedures thereof. A matching processor sequentially compares and collates the input pattern with the reference patterns to find out that standard pattern with which the input pattern is matched with the highest similarity. When the input pattern is matched with several reference patterns, a detailed recognition unit performs a detailed recognition process using the detailed characteristic data of these reference patterns to finally select the correct one from among the reference patterns. The main reference additionally stores identification marks to identify specific reference segments necessary to acquire the above detailed characteristic data.

U.S. Pat. No. 4,769,716 to Casey et al discloses an improved method for transmitting facsimiles of scanned symbols. Prototype facsimiles of each symbol in a library are enhanced by averaging the representations of each scanned symbol with a respective previously created prototype facsimile for that symbol. The amount of white space at opposite sides of each symbol prototype is determined. The enhanced prototype facsimile for each scanned symbol is associated with positional parameters denoting the average white space at said opposite sides of each symbol.

A second group of patents is directed to on-line handwriting recognition using a set of prototypes. However, none of theses patents teach how to modify these prototypes. This second group includes:

U.S. Pat. No. 4,718,103 to Shojima et al discloses a system in which a handwritten pattern approximated to series of polygonal lines consisting of segments is compared with a candidate pattern selected from dictionary patterns stored in the memory, basing on the angular variation between adjacent segments of both patterns. If the difference between angular variations of adjoining segments of both patterns is outside of a certain range, it is tested whether the difference between an angular variation across three or more consecutive segments and the above reference angular variation is within the range.

U.S. Pat. No. 4,653,107 to Shojima et al discloses a system in which coordinates of a handwritten pattern drawn on a tablet are sequentially sampled by a pattern recognition unit to prepare pattern coordinate data. Based on an area encircled by segments created by the sampled pattern coordinate data of one stroke and a line connecting a start point and an end point of the one-stroke coordinate data, the sampled pattern coordinate data of the one stroke is converted to a straight line and/or curved line segments. The converted segments are quantized and normalized. The segments of the normalized input pattern are rearranged so that the input pattern is drawn in a predetermined sequence. Differences between direction angles for the rearranged segments are calculated. Those differences are compared with differences of the direction angles of the dictionary patterns read from a memory to calculate a difference therebetween. The matching of the input pattern and the dictionary pattern is determined in accordance with the difference. If the matching fails, the first or last inputted segment of the input pattern is deleted or the sampled pattern coordinate data of the next stroke is added, to continue the recognition process.

U.S. Pat. No. 4,284,975 to Odaka discloses a pattern recognition system operating on an on-line basis for hand-written characters, in particular for hand-written Chinese characters comprising a character input unit for providing the coordinates of a plurality of points on the strokes of a written input character, a classification unit for classifying the input characters to the first group having equal to or less than three strokes, and the second group having equal to or more than four strokes, an approximate unit for providing a plurality of feature points to each of strokes, the number of strokes being six for each stroke in the first group of characters and three for each stroke in the second group of characters, a pattern difference calculator for providing the sum of the length between the feature points of the input character and those of the reference characters which are stored in the reference pattern storage, and a minimum difference detector for determining the minimum length among the pattern differences thus calculated. The input character is recognized to be the same as the reference character which provides said minimum length.

U.S. Pat. No. 4,972,496 to Sklarew discloses a keyboardless entry computer system which includes a transparent input screen that generates positional information when contacted by a stylus, and a display screen mounted physically below the input screen such that a character that is displayed can be seen below the input screen. The system includes a computer that has been programmed to compile the positional information into Strokes, to calculate Stroke characteristics, and then compare the Stroke characteristics with those stored in a database in order to recognize the symbol drawn by the stylus. Key features of the system are: (1) transparent position sensing subsystem; (2) underlying display on which to mimic drawing of sensed positions and to show characters or symbols; (3) means to convert sensed positions first into plotted Points and then into recognized characters or symbols; and (4) means to "learn" to associate sensed input positions with a character or symbol.

According to the present invention, an on-line handwriting recognition system safely reduces similarity between different prototypes by allowing a user to interactively delete confusingly similar prototypes, while at the same time not being allowed to delete prototypes that are needed for recognition accuracy.

DISCLOSURE OF THE INVENTION

A method and apparatus for interactive editing of prototypes that are confusingly similar, that is, prototypes that are close to each other in a prototype space. Prototypes which are needed for recognition accuracy are not permitted to be edited.

BRIEF DESCRIPTION OF THE DRAWINGS

FIG. 4 is a flowchart of possible user actions on an unintended label.

BEST MODE OF CARRYING OUT THE INVENTION

This invention is directed to a procedure for interactive editing of prototypes that are close to each other in prototype space. This procedure improves the separation of prototypes and increases recognition accuracy. On-line recognition of handwriting by prototype matching is optimal when there is a minimum of prototype pairs whose similarity leads to recognition confusion. Stand-alone prototype editors allowed unrestricted deletion of prototypes. However, unconstrained user actions can lower recognition accuracy, since "good" prototypes could be deleted. Prototype set modification according to this invention is an improvement over the previous one in several respects. First, it is incorporated into a handwriting training program which creates prototypes and then performs recognition using these prototypes. Whenever unknown writing is misrecognized, this invention can be invoked (a) to show the writer the reason for the misrecognition, i.e., the matching prototype whose label differs from the intended character, and (b) to present action choices. Second, in this invention the possible actions are limited by the user's own level of knowledge. The only prototypes he or she is aware of are those causing confusion.

Figure 1:
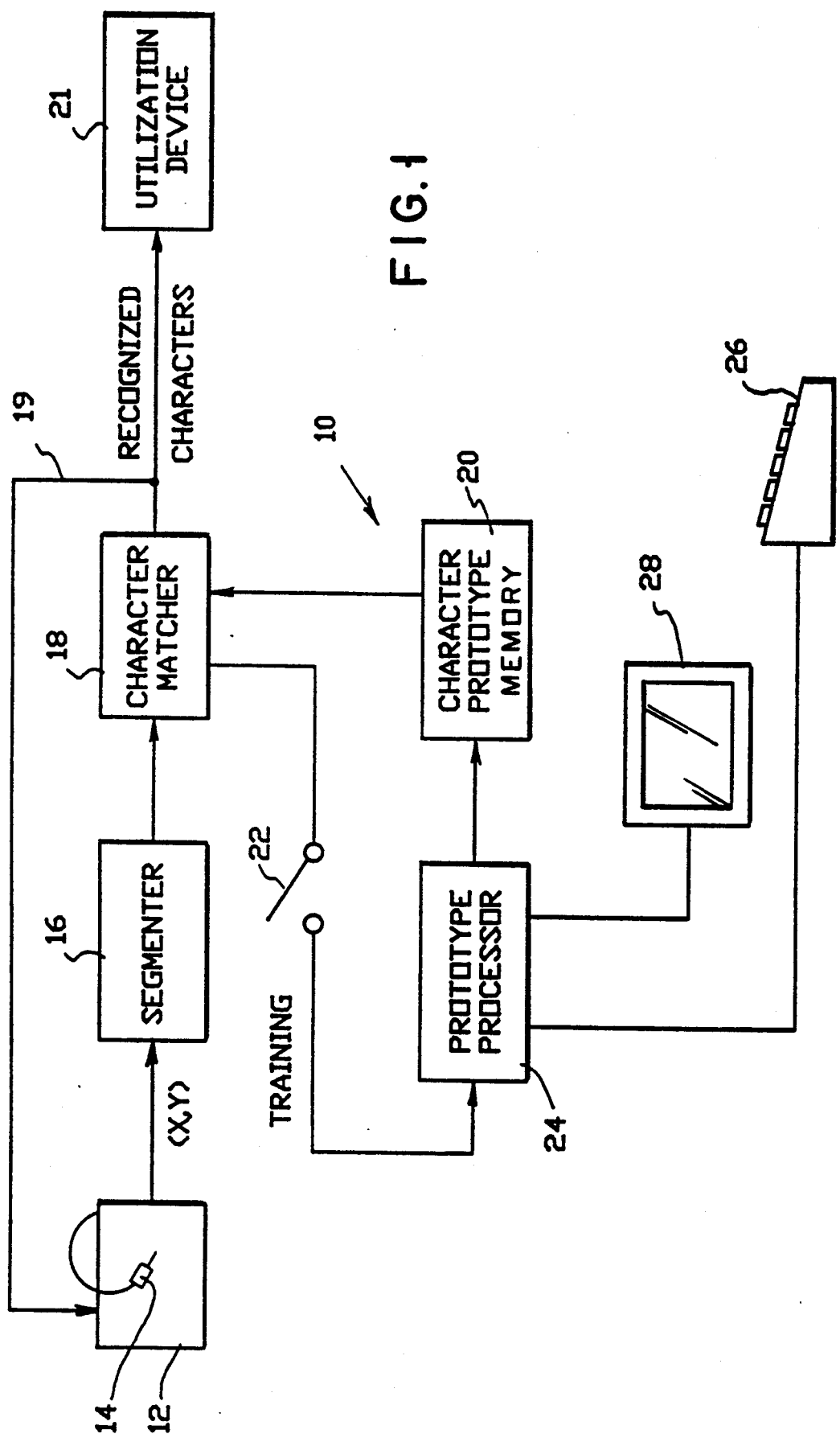
FIG. 1 is a simplified block diagram of a handwriting recognition system constructed and operated in accordance with the invention.

Referring to FIG. 1 there is shown an on-line handwriting character recognition system 10 constructed and operated in accordance with the invention. System 10 includes a handwriting transducer comprised of an integrated electronic tablet and display 12 having a writing implement, such as a stylus 14. In response to handwritten characters the transducer outputs a serial stream of (x,y) coordinate pairs corresponding to a position of the stylus 14 relative to a tablet 12 coordinate system. The coordinate pairs are provided to a stroke segmenter 16 that identifies a beginning and an end of discrete handwritten strokes. Strokes are provided to a character matcher 18. Character matcher 18 is coupled to a store 20 of predetermined character prototypes for comparing points of input strokes to points of stored character prototypes so as to identify, to within some probability, that an input stroke or assemblage of strokes represents a specific character. Recognized characters are output from the matcher 18 via line 19 to tablet and display 12 to display the recognized characters, or may be applied to a utilization device 21 such as a display, an application, such as a word processing program, or the like. In some systems the functionality of the segmenter 16 and the character matcher 18 may be combined within one handwritten stroke processing unit.

Character prototypes may be provided to the store 20 during a training session held with a user of the system 10. The character prototypes may be entered by a specific user of the system and thereafter used only when the specific user enters handwritten characters. Also, a global or universal set of character prototypes may be generated for use with more than one user.

In this regard a starter prototype set may be designed as an initial prototype set to be used by any writer on first using the system 10. If desired, a writer may then add character prototypes in his/her own writing style to obtain a prototype set tailored to the writer, also referred to as an individualized prototype set. In that a starter prototype set is typically created by an expert in handwriting recognition systems, there is no burden placed on a user of the system 10 to follow any writing suggestions or constraints.

In any case, during a training session characters from character matcher 18 are routed through a physical or logical switch 22 to a prototype processor 24, which for example may be an Intel '386 processor. The output of prototype processor 24 is a series of averaged prototype characters that are supplied to store 20 for subsequent use during a handwriting recognition session conducted with a user of the system 10.

Prototype processor 24 is also coupled to a user input and output device, such as a keyboard 26 and a display device 28 for controlling the operation of prototype processor 24 in the deletion of confusing prototypes as used during a handwriting recognition session conducted with a user of the system 10.

It is to be appreciated that the integrated electronic tablet and display 12 could be replaced by an electronic tablet not having a display, with display of characters being on the utilization device 21 or display 28.

Figure 2:
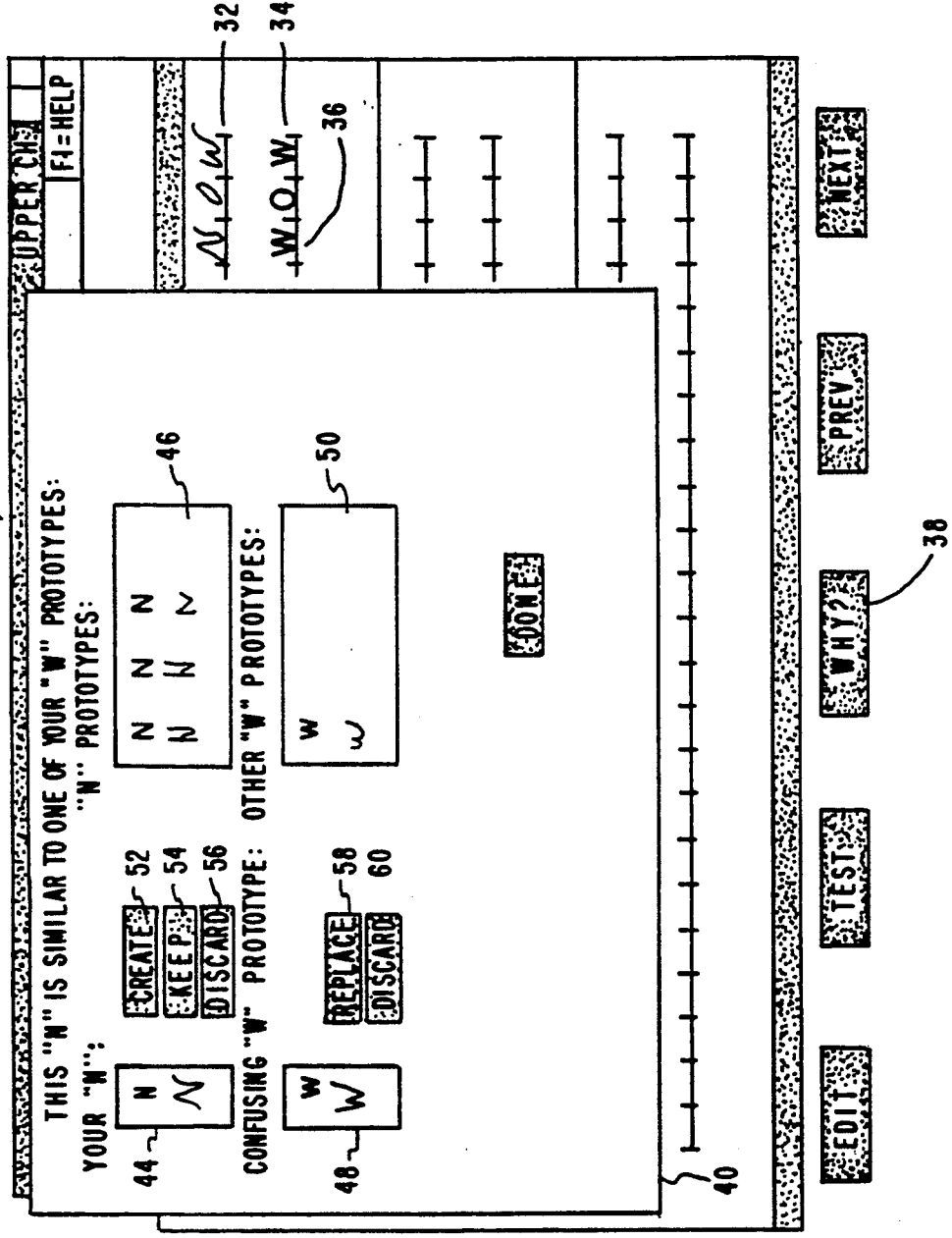
FIG. 2 is a diagram of the face of a display device showing possible user actions according to the invention.

Refer now to FIG. 2 which illustrates a display device, such as the face 30 of electronic tablet and display 12 or display device 28. For purpose of description only, consider it to be the face of electronic tablet and display 12.

A user writes an unknown writing such as "now" in the character writing space 32, which is misrecognized as "wow" by the system as indicated in recognized character space 34. The user then utilizes the stylus 14 (FIG. 1) to touch the "w" 36 which is incorrect, and then touches the "WHY?" button 38 to determine the cause of the error. Screen 40 then appears in response to the touching of button 38.

The cause of the error is indicated by sentence 42 "This 'n' is similar to one of your 'w' prototypes".

The misrecognized writing is redrawn in box 44 with the prompted (intended) label n; existing prototypes for n are shown in box 46. There are three such prototypes. The matched prototype (with unintended label w) is shown in box 48; other prototypes for this (unintended) label w are shown in box 50. The user sees the similarity between the unknown prototype and matching prototype and can decide how to alter the prototype set to prevent this confusion from repeating. Actions can be performed on prototypes for either the intended label n or unintended label w.

Actions on the intended (correct) label n are as follows:

A CREATE button 52 allows the user to create a new prototype for the intended label by writing training samples into a window which pops up. This option is valid if neither the existing prototypes nor the new writing are seen as typical for the label. This will resolve the confusion if the new prototype is closer to the unknown than the incorrectly matched prototype. That is, another new prototype n is written which would become a fourth prototype n in box 46.

A KEEP button 54 causes the new writing of n shown in box 44 to become a prototype for the intended label, in the event that the user deems it to be typical. This resolves the confusion since the new prototype will be the closest match to the unknown, being equal to it.

A DISCARD button 56 erases the writing of n from the original write-in window 32 if the user decides the writing is an error.

Actions on the unintended (incorrect) label w are as follows:

A REPLACE button 58 located next to the unintended prototype w in block 48 allows the user to write new samples into a pop-up window. These will be averaged to become a new prototype for unintended label w, replacing the writing of w which caused the confusion. This option is viable when the existing prototype (which led to the confusion) is obsolete and not representative of the user's writing style, nor is any of the other prototypes for that label. This reduces confusion by removing the top (and incorrect) contender from the list of matching prototypes; any subsequent match has a better chance of being correct.

A DISCARD button 60 can be used for the same purpose as REPLACE for the confusing w prototype in those cases where there is already an alternate prototype w which is typical for the unintended label w. If the confusing prototype is the only one for this label then the command is disabled. Thus no alphabet character can become unrecognizable by having its only prototype accidentally removed from the prototype set. DISCARD reduces confusion for the same reason as REPLACE.

Figure 3:
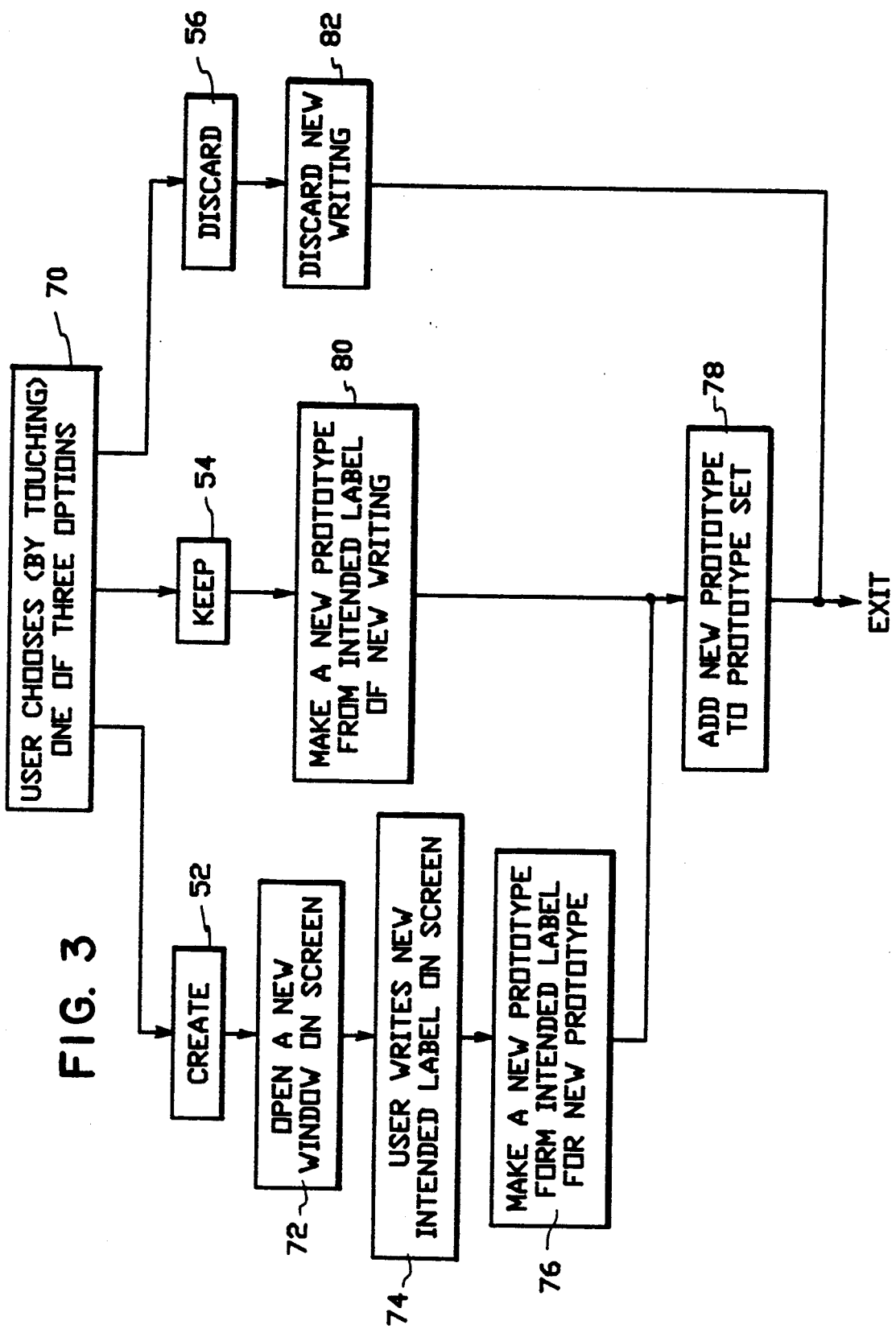
FIG. 3 is a flowchart indicative of possible user actions on an intended label.

Refer now to the flow chart of FIG. 3 which illustrates possible user actions for the intended label, in this instance "n". As stated relative to FIG. 2, the user chooses one of three options as indicated at box 70. These are the touching of either box 52, 54 or 56 (FIG. 2) with the stylus 14 (FIG. 1).

If box 52 is touched, the choice is made to create a new prototype n, which would be a fourth n which is added to the set shown in box 46 (FIG. 2). A new window would be opened on the display screen as indicated at block 72. The user then writes a new intended label on the screen, in this case a new n, as indicated at block 74. The prototype processor 24 (FIG. 1) then creates a new prototype n as indicated at block 76. The new prototype n is added to the prototype set as indicated at block 78, and is stored in the character prototype store 20 (FIG. 1).

If box 54 is touched, the choice is made to keep the new writing of the intended label n. Accordingly, a new prototype is created from this intended label n of this new writing n by the prototype processor 24 (FIG. 1) as indicated at block 80. This new prototype n is then added to the character prototype store 20 as indicated at block 78.

If box 56 is touched, the choice is made to discard the new writing of the intended label n. Accordingly, the prototype processor 24 removes it from the character prototype store as indicated at block 82, and an exit is made.

Refer now to the flow chart of FIG. 4 which illustrates possible user actions on the unintended label, in this instance "w". As stated relative to FIG. 2, the user chooses one of two options as indicated at block 90. These are the touching of either box 58 or box 60 (FIG. 2) with the stylus 14 (FIG. 1).

If box 58 is touched, the choice is made to replace the prototype w that caused the confusion with a new prototype w. This is accomplished by the user writing a new w to replace the old prototype w as indicated at block 92. Accordingly, the prototype processor 24 (FIG. 1) creates a new prototype w as indicated at block 94. This new prototype w is added, and the unintended prototype w is removed from the character prototype store 20 (FIG. 1) as indicated at block 96.

If box 60 is touched, the choice is made to discard the unintended prototype w that caused the confusion. As stated earlier, no alphabet character can become unrecognizable by having its only prototype accidentally removed from the prototype set. Therefore, at decision block 98 there is a determination made whether or not there is only one prototype. If there is only one prototype, an indication is made on the screen that only one prototype exists, and the system is inhibited from discarding the only prototype as indicated at block 100. If there is more than one prototype w, the unintended prototype w is removed from the character prototype store 20 by the prototype processor 24 (FIG. 1) as indicated at block 102.

We claim:

1. In a handwriting recognition system, the combination comprising:
   an integrated electronic tablet on which a user may write characters with a stylus and display on which recognized characters may be displayed, said tablet including action button surfaces which when touched by the user with the stylus invoke predetermined actions relative to written characters and displayed recognized characters;
   a prototype processor for processing prototype characters written on said tablet by the user in a training session;
   a character prototype memory in which said prototype characters processed by said prototype processor are stored;
   a character matcher which compares unknown characters written by the user with prototype characters stored in said character prototype memory to determine the best match between the unknown characters and the prototype characters for producing recognized characters;
   means for displaying on said display what the user is writing on said tablet;
   means for displaying recognized characters from said character matches on said display in response to the user writing on said tablet;
   means for determining if any characters in corresponding character positions in what the user has written and is displayed on said display, and what is recognized and displayed on said display as a recognized character are different;
   means responsive to said means for determining for displaying the written character and the recognized character at the corresponding character position as an intended character indicative of the displayed written character and an unintended character indicative of the displayed recognized character, respectively;
   means for displaying at least one prototype character stored in said character prototype memory for each of the intended character and the unintended character; and
   means for removing or replacing intended and unintended character prototypes in said character prototype memory in response to the user touching predetermined ones of the action button surfaces with the stylus in response to viewing the intended character and the unintended character and their respective prototypes on the display.

2. The combination claimed in claim 1, wherein said action button surfaces include for an intended character:
   (a) a create button surface which in response to being touched by the user with the stylus includes means for creating a new prototype character for the intended character in response to a new writing of the character by the user;
   (b) a keep button surface which in response to being touched by said user with the stylus includes means for for storing the created new prototype of the intended character in said character prototype memory; and
   (c) a discard button surface which in response to being touched by said user with the stylus includes means for discarding the unknown character writing on said tablet.

3. The combination claimed in claim 2, wherein the action button surfaces include for the unintended character:
   (a) a replace button surface which in response to being touched by the user with the stylus includes means for replacing the prototype for the unintended character with a new prototype produced by the user making a new writing of the corresponding character on said tablet with said stylus, including means for the storing said new writing as a prototype in said character prototype memory; and
   (b) a discard button surface which in response to being touch by the user with the stylus includes means for discarding the prototype for the unintended character by removing same from said character prototype memory.

4. The combination claimed in claim 3, including:
   means for inhibiting the discarding of the prototype for the unintended character if the prototype for the unintended character is the only prototype for that character.

5. In a handwriting recognition system, the combination comprising:
   an electronic tablet on which a user may write characters with a stylus;
   a display surface on which a plurality of screens can be displayed, and on which the characters written by said user is displayed, and on which what is recognized by a character recognizer as what was written by the user is displayed, said display screens including:
   (a) a first screen having a first area where at least one character of what is written is displayed, a second area where said at least one character of what is recognized as being written is displayed, and a third area in which there is at least one action button surface which in response to being touched by said stylus invokes a predetermined action to display a second screen, wherein;
   (b) said second screen includes a first area in which said at least one character of what is written is displayed as an intended character, a second area in which prototypes of the intended character is displayed, and a third area which includes a plurality of action button surfaces which in response to being touched by said user with the stylus invokes predetermined actions relative to the intended or the intended character prototypes, and a fourth area in which said at least one character of the recognized writing is displayed as an unintended character, a fifth area in which prototypes of the unintended character is displayed, and sixth area which includes a plurality of action button surfaces which in response to being touched by said stylus invokes predetermined actions relative to said unintended character or the unintended character prototypes; and means responsive to the touching of any of the action button surfaces to invoke the corresponding predetermined actions.

6. The combination claimed in claim 5, wherein said action button surfaces in said third area of said second screen include for intended characters:

(a) a create button surface which in response to being touched by the user with the stylus includes means for creating a new prototype character for the intended character in response to a new writing of the character by the user;

(b) a keep button surface which in response to being touched by said user with the stylus includes means for storing the created new prototype of the intended character in a character prototype memory; and (c) a discard button surface which in response to being touched by said user with the stylus includes means for discarding the unknown character writing on said tablet.

7. The combination claimed in claim 6, wherein the action button surfaces in said sixth area of said second screen include for unintended characters:

(a) a replace button surface which in response to being touched by the user with the stylus includes means for replacing the prototype for the unintended character with a new prototype produced by the user making a new writing of the corresponding character of said tablet with said stylus, including means for storing said new writing as a prototype in said character prototype memory; and (b) a discard button surface which in response to being touched by the user with the stylus includes means for discarding the prototype for the unintended character by removing same from said character prototype memory.

8. The combination claimed in claim 7, including:

means for inhibiting the discarding of the prototype for the unintended character if the prototype for the unintended character is the only prototype for that character.

9. In a handwriting recognition system which includes an integrated electronic tablet on which a user may write characters with a stylus and display on which recognized characters may be displayed, said tablet including action button surfaces which when touched by the user with the stylus invoke predetermined actions relative to written characters and displayed recognized characters; a prototype processor for processing prototype characters written on said tablet by the user in a training session; a character prototype memory in which said prototype characters processed by said prototype processor are stored; a character matcher which compares unknown characters written by the user with prototype characters stored in said character prototype memory to determine the best match between the unknown characters and the prototype characters for producing recognized characters, a method comprising the steps of:

displaying on said display what the user is writing on said tablet;

displaying said recognized characters on said display;

determining if any characters in corresponding character positions in what the user has written and what is recognized and displayed on said display as a recognized character are different;

displaying the written character and the recognized character at the corresponding character position as an intended character indicative of the written character and an unintended character indicative of the displayed recognized character;

displaying at least one prototype character stored in said character prototype memory for each of the intended character and the unintended character; and removing or replacing intended and unintended character prototypes in said character prototype memory in response to the user touching predetermined ones of the action button surfaces with the stylus in response to viewing the intended character and the unintended character and their respective prototypes on the display.

10. The method claimed in claim 9, wherein said action button surfaces include for intended characters:

(a) a create button surface which in response to being touched by the user with the stylus includes means for creating a new prototype character for the intended character in response to a new writing of the character by the user;

(b) a keep button surface which in response to being touched by said user with the stylus includes means for for storing the created new prototype of the intended character in said character prototype memory; and (c) a discard button surface which in response to being touched by said user with the stylus includes means for discarding the unknown character writing on said tablet.

11. The method claimed in claim 10, wherein the action button surfaces include for the unintended character:

(a) a replace button surface which in response to being touched by the user with the stylus includes means for replacing the prototype for the unintended character with a new prototype produced by the user making a new writing of the corresponding character on said tablet with said stylus, including means for storing said new writing as a prototype in said character prototype memory; and (b) a discard button surface which in response to being touched by the user with the stylus includes means for discarding the prototype for the unintended character by removing same from said character prototype memory.

12. The method claimed in claim 11, including the steps of:

inhibiting the discarding of the prototype for the unintended character if the prototype for the unintended character is the only prototype for that character.

13. The combination claim in claim 1, including means for displaying indicia on said display which is indicative of an error which caused what is written to be different than what is recognized.

14. The combination claimed in claim 13, wherein said indicia is a sentence explaining the error.

15. The combination claimed in claim 5, including means for displaying indicia on said display surface which is indicative of an error which caused what is written to be different than what is recognized.

16. The combination claimed in claim 15, wherein said indicia is a sentence explaining the error.

17. The method of claim 9, including the step of:
displaying indicia on said display which is indicative of an error which caused what is written to be different than what is recognized.

18. The method of claim 17, wherein said indicia is a sentence explaining the error.

19. In a handwriting recognition system, the combination comprising:

an integrated electronic tablet on which a user may write characters with a stylus and display on which recognized characters may be displayed, said tablet including action button surfaces which when touched by the user with the stylus invoke predetermined actions relative to written characters and displayed recognized characters;

a prototype processor for processing prototype characters written on said tablet by the user in a training session;

a character prototype memory in which said prototype characters processed by said prototype processor are stored;

a character matcher which compares unknown characters written by the user with prototype characters stored in said character prototype memory to determine the best match between the unknown characters and the prototype characters for producing recognized characters;

means for displaying on said display what the user is writing on said tablet;

means for displaying recognized characters from said character matches on said display in response to the user writing on said tablet;

means for determining if any characters in corresponding character positions in what the user has written and is displayed on said display, and what is recognized and displayed on said display as a recognized character are different; and means for displaying indicia on said display which is indicative of an error which caused what is written to be different than what is recognized.

20. The combination claimed in claim 19, wherein said indicia is a sentence explaining the error.

* * * * *